May 7, 1968     A. T. KORNYLAK     3,381,798
ROLLER FLIGHT CONVEYOR
Filed Dec. 16, 1965
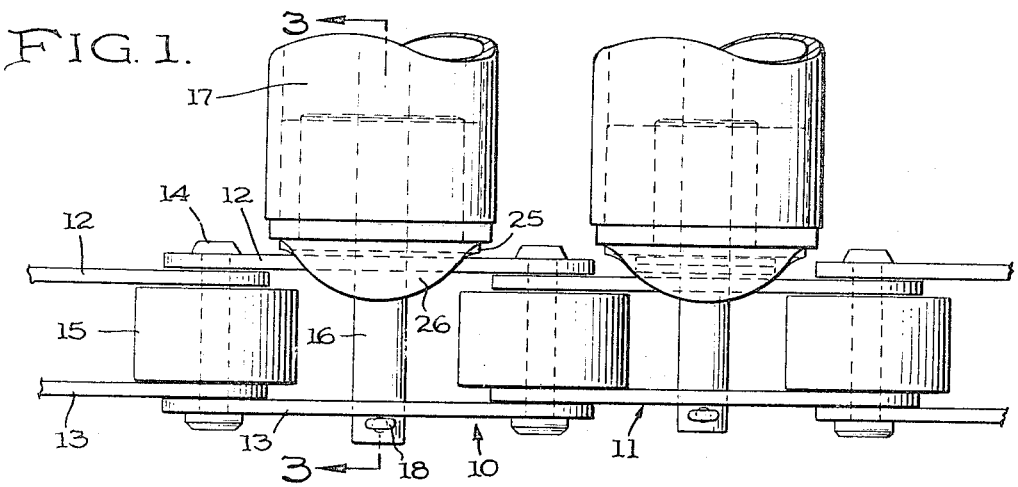
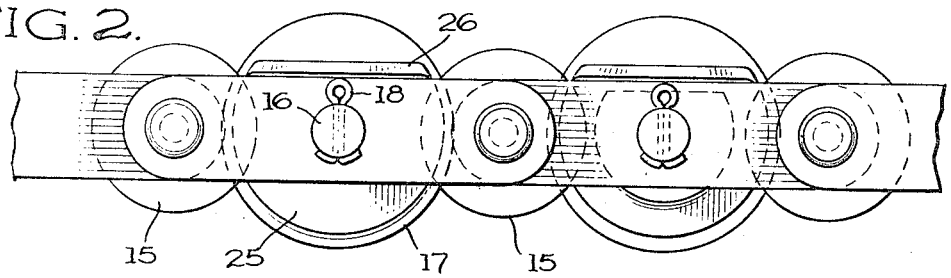
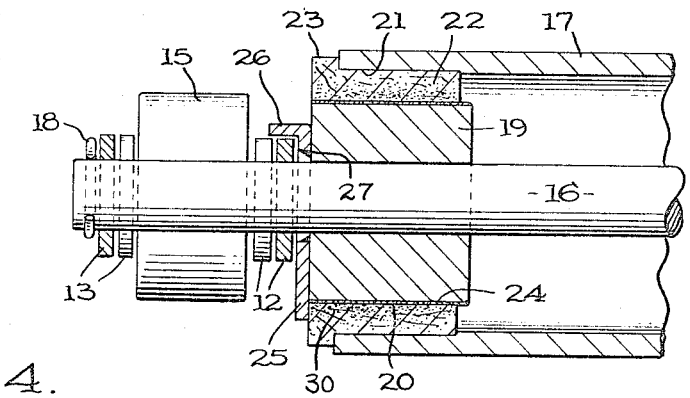
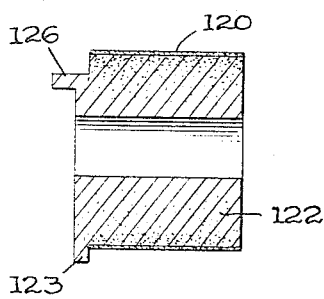
INVENTOR
ANDREW T. KORNYLAK
BY *C Chandlee Pidgeon*
AGENT

United States Patent Office 3,381,798
Patented May 7, 1968

3,381,798
ROLLER FLIGHT CONVEYOR
Andrew T. Kornylak, 400 Heaton St.,
Hamilton, Ohio 45011
Filed Dec. 16, 1965, Ser. No. 514,348
8 Claims. (Cl. 198—183)

ABSTRACT OF THE DISCLOSURE

A roller flight conveyor having side chains with certain links carrying flight rollers which include shafts mounted in such links, such shafts having enlarged portions thereon, and hollow flight rollers. Bearings situated between the interior of the flight rollers and the enlarged portions are impregnated with a resin which produces a drag on the rollers enabling them to move loads up inclines of somewhat more than 6°. The preferred resin is rosin.

---

This invention relates to improvements in Roller Flight Conveyors, and more particularly to a means and a method of providing a drag on the bearings of the flight rollers of a roller flight conveyor, whereby such conveyor may move relatively heavy loads up inclines having higher gradients than has been heretofore possible.

An object of this invention is the provision of an arrangement of bearings for the flight rollers of a roller flight conveyor to provide resistance to the rotation thereof.

Another object of this invention is the provision of a flight roller bearing having inherent friction producing means.

A further object of this invention is in a method for imparting inherent friction producing means in a bearing for a flight roller, to be used in a roller flight conveyor.

Another object of this invention is the provision of a bearing formed of a permeable material and being impregnated with friction producing material.

These and other objects will become apparent upon consideration of the following specification, taken with the accompanying drawings forming a part thereof.

In the drawings wherein like parts are represented by like characters of reference throughout the several views:

FIG. 1 is a fragmentary plan view of a portion of a roller flight conveyor;

FIG. 2 is a front view of the structure in FIG. 1;

FIG. 3 is a fragmentary section on the line 3—3 of FIG. 1, looking in the direction of the arrows; and FIG. 4 is a vertical section of a modified form of bearing.

Referring now to FIG. 1, numeral 10 refers to a portion of a roller flight conveyor comprising chains 11, of which there are two, but as the other chain and its accessories are identical except for allochiral arrangement of certain parts, only one is necessary for disclosing my invention. The chain 11 includes links 12 and 13 articulately connected by pins 14 which form bearings for rollers 15.

Intermediate the ends of links 12, 13, there are suitable openings for receiving the shafts 16 of the flight rollers 17. The shafts 16 are retained by cotter pins 18 passing through suitable openings adjacent the outer face of links 13. The bearing means constituting the improvement herein comprise an enlarged bushing or hub 19 fitted on the shaft 16 to provide a bearing periphery 20 much greater than normal in such devices, but less than the inner diameter of the tubular roller 17. Between the periphery 20 of the bushing 19 and the inner surface 21 of the roller 17, I provide an annular bearing or sleeve 22 formed of suitable material having suitable hardness and coefficient of friction, which may be permeable and may be wood or any material that may be impregnated in the same or a similar manner. The bearing 22 is provided with an annular flange 23, engaging the outer end of the roller 17. The bearing 22 is impregnated with a friction producing material, such as rosin, in the following manner. When rosin is employed, the bearing is heated to a temperature in the range of 150° to 200° F. to drive out oils and moisture. The bearing is then dipped in an alcohol solution of rosin for about three seconds. After the first dip coat is dry, a brush coat of the same solution is applied to the inner surface 24 of the bearing. Additional coatings may be applied as desired or necessary. The bearing 22 is inserted in the interior of the roller 17 with a press fit, and maintains a friction drag on the periphery 20 of the bushing 19. This manner of coating and impregnating causes greater concentration of friction producing material at the surface 20 as indicated at 30.

One means to prevent rotation of the bushing 19 on the shaft 16 is a washer 25, having a portion bent over as at 26 being suitably affixed to the bushing 19, as by welding indicated at 27. In some cases the washer 25 may be made integral with the bushing 19. The bent over portion 26 of the washer 25 engages over a link 12 of the chain 11.

Another form of the means to prevent rotation of the bearing relative to the shaft 16 is shown in FIG. 4. In this figure, the bearing 122 has a part circular flange 123 and a laterally projecting lug 126 adapted to engage over a link 12 of the chain 11, in the same manner as the bent over portion 26 of the washer 25 engages over the link 12. The bearing 122 is substituted for the bushing 19 and the bearing 22, and is treated in the same manner as the bearing 22. Due to this treatment the friction producing material has greater concentration adjacent the outer periphery 120 as indicated at 130. The outer periphery 120 is provided with a surface having a high coefficient of friction. In other respects, the bearing 122 operates in the same manner as the bearing 20, and may in some cases be the preferred form of my invention. The bearing 122 acts in much the same manner as does the bearing 22. Since it cannot rotate with the shaft 16, the roller 17, rotating with the shaft, rotates with respect to the bearing 122, but this rotation is opposed by the friction material in the bearing.

Having now described my invention in a preferred form thereof, I desire it to be understood that various modifications may be made within the skill of the art and the scope of the appended claims.

I claim:

1. A roller conveyor comprising a pair of parallel chains, supporting shafts secured to said chains, a roller surrounding each shaft, and bearing means mounting each roller for rotation about its respective shaft, said bearing means comprising a pair of hubs mounted on each said shaft, each hub having a bearing surface, a pair of sleeves in each roller having a bearing surface mounted in slidable contact with said hub bearing surfaces, said contacting surfaces comprising materials providing a high coefficient of friction whereby to provide for friction braking between said surfaces, and means locking said hubs against rotation about the said supporting shafts.

2. A device as defined in claim 1 wherein the locking means comprises a lug secured to the hub and projecting over the chain.

3. A device as defined in claim 1 wherein one of said bearing surfaces comprises rosin.

4. A device as defined in claim 1 wherein the sleeve is of a porous material impregnated with rosin and the bearing surface is a coating of rosin.

5. A device as defined in claim 1 wherein the hub is of a porous material impregnated with rosin and the bearing surface is a coating of rosin.

6. A bearing comprising a hub member having a laterally extending lip and a cylindrical bearing surface, a sleeve having a cylindrical bearing surface mounted in slidable contact with the hub bearing surface, said contacting surfaces comprising materials providing a high coefficient of friction.

7. A bearing as defined in claim 6 wherein the sleeve is of a porous material impregnated with rosin and a coating of rosin is on the sleeve bearing surface.

8. A bearing as defined in claim 6 wherein the hub is of a porous material impregnated with rosin and a coating of rosin is on the hub bearing surface.

References Cited

UNITED STATES PATENTS

| 538,722 | 5/1895 | Biedermann | 188—83 |
| 1,436,158 | 11/1922 | Fisher | 188—251 |
| 1,519,322 | 12/1924 | Novak | 188—251 |
| 1,590,392 | 6/1926 | Peters | 308—241 |

FOREIGN PATENTS

| 898 | 10/1910 | Great Britain. |
| 424,726 | 2/1935 | Great Britain. |

EVON C. BLUNK, *Primary Examiner.*

RICHARD E. AEGERTER, *Examiner.*

M. L. AJEMAN, *Assistant Examiner.*